Jan. 31, 1956     W. D. KERNS     2,732,771

METHOD OF ROUTING

Filed Feb. 29, 1952

*INVENTOR.*
WILSON D. KERNS
BY

*William P. Lane*

ATTORNEY 2,732,771

METHOD OF ROUTING

Wilson D. Kerns, Los Angeles, Calif., assignor to North American Aviation, Inc.

Application February 29, 1952, Serial No. 274,121

4 Claims. (Cl. 90—14)

This invention relates to a method of routing and more particularly to a method of routing materials such as stainless steel, titanium and plastic-impregnated glass cloth.

For certain types of parts routing provides a particularly desirable cutting method because it results in a relatively smooth edge and does not tend to introduce strain hardening. However, attempts to perform a routing operation on materials such as stainless steel, titanium and plastic-impregnated glass cloth have proved quite unsuccessful in the past. For normal routing procedures even the highest quality router bits when used in routing such materials have extremely short life. Conventional routing methods with such materials cause extreme localized heating which work hardens the material in the vicinity of the cut and quickly destroy the router bit. In addition, plastic-impregnated glass cloth will produce large quantities of dust during the customary routing operation. This dust is not only an inconvenience but also injurious to the health of the machine operator who breathes it. These serious objections have meant that routing of such materials has not been feasible and has not been undertaken commercially.

It is therefore an object of this invention to provide a successful method for routing material such as stainless steel, titanium and plastic-impregnated class cloth.

Another object of this invention is to provide a method of routing that provides improved router bit life.

An additional object of this invention is to provide a method of routing whereby a minimum amount of dust injurious to the health of the operator will be produced.

A further object of this invention is to provide a method of routing whereby a larger portion of the router bit cutting edge is utilized.

Figure 1:
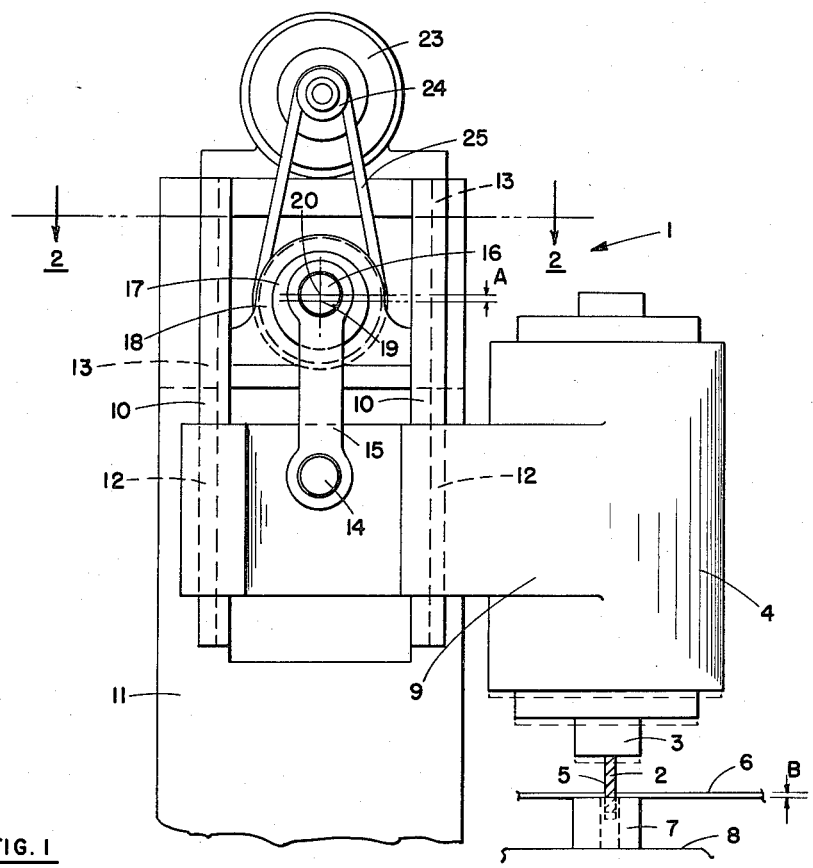
Figure 2:
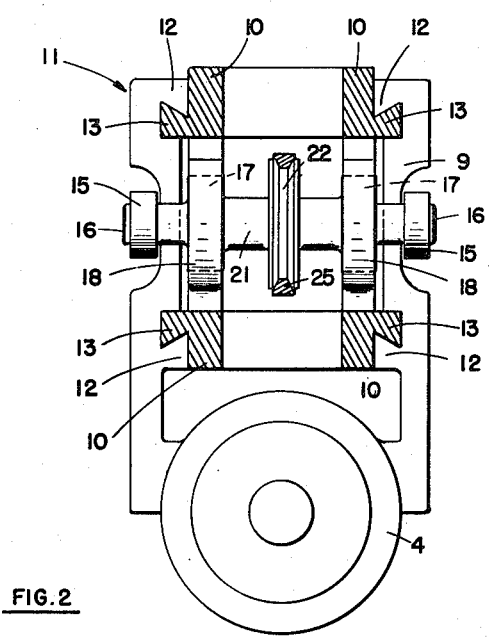
Figure 3:
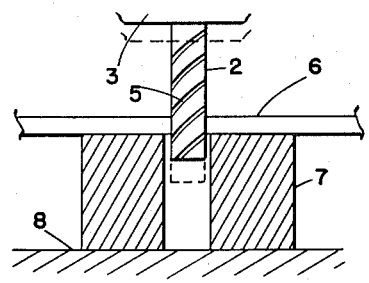

These and other objects will become apparent from the following detailed description taken in connection with the accompanying drawings in which:

Fig. 1 is a side view of a machine for routing according to the teachings of this invention, Fig. 2 is a top plan view, partially in section, along line 2—2 of Fig. 1, and Fig. 3 is a fragmentary view of the router bit and workpiece.

To perform a routing operation according to the teachings of this invention, routing machine 1 includes router bit 2 firmly held in chuck 3 which may be rotated by means of motor 4. Router 2 is fluted at 5 to provide cutting edges along the side of the router bit. Thus rotation of the router bit by motor 4 can cut the edge of a workpiece 6 brought into engagement with the router bit. The workpiece may be held upon support 7 resting on bed 8.

Secured to and projecting from motor 4 is a bracket member 9 which slidably engages rails 10 of the machine framework 11. Thus, as may best be seen by reference to Fig. 2, flanges 12 of bracket 9 mate with complementary flanges 13 of rails 10. In this manner the bracket and motor assembly may slide vertically along rails 10 and is precluded from any lateral movement by the cooperating flanges.

Projecting from opposite sides of bracket 9 are pins 14, each of which fits within a complementary opening of a link 15. The other ends of links 15 engage pins 16 which in turn project from drive discs 17. Bearing blocks 18 rest on portions of frame 11 and rotatably support discs 17. In this manner bracket 9 is supported by the links against vertical movement.

It should be observed that each disc 17 rotates within a bearing block about a center 19, while each pin 16 is attached to its disc with the center 20 of the pin displaced a distance A from center 19. Thus rotation of disc 17 will move pins 16 through a circular path whereby links 15 move the bracket and motor assembly through a distance of twice A upwardly and twice A downwardly for each revolution. Thus every time discs 17 make one revolution router bit 2 moves up and down through a vertical stroke of twice the distance A.

To effect rotation of discs 17 these discs may be integral with or secured to a shaft 21 on which is fixed pulley 22. Disposed above pulley 22 and resting on frame 11 is a motor 23, the drive shaft of which is provided with a pulley 24. A belt 25 interconnects the two pulleys so that rotation of motor 23 drives belt 25 which in turn rotates pulley 21 and discs 17.

According to the teachings of this invention, motor 5 is rotated to a speed of between 12,000 and 20,000 revolutions per minute, preferably in the neighborhood of 18,000 revolutions per minute. Turning the router bit at a speed below this range will cause a longer period of contact with the router bit and excessive localized heating may result. At the same time motor 23 is rotated at a much slower speed to vertically reciprocate router bit 2. Workpiece 6, which may be stainless steel, titanium or plastic-impregnated glass cloth, is then moved into engagement with the side of router bit 2, as illustrated in Fig. 1, and a cutting operation performed. It is important in routing these materials successfully that the distance two times A, which is the vertical stroke of the router bit, is at least as great as the distance B which is the thickness of the workpiece. This assures that all portions of the router bit will move out of contact with the workpiece at some time during the routing operation. When a portion of the router is out of contact with the workpiece the heat therein generated during cutting may dissipate. Not only is the router prevented from overheating but the workpiece itself by engaging a cooler cutter will also be cooler and there will be less tendency for work hardening. This also means that more of the cutting edges of the router are used in the routing operation so that any deterioration of the router bit is equalized along the length of the router bit. Distance twice A, through which the router is reciprocated, may be greater than thickness B of the workpiece so long as the router is always in contact with the workpiece and is not withdrawn beyond the workpiece or reciprocated to a point where chuck 3 comes into contact with the surface of the workpiece. A fluid used as a cutting oil and lubricant is normally sprayed on a router bit during a router operation. This invention improves the effectiveness of this fluid by assuring improved distribution of the fluid along the router due to the vertical reciprocation of the router bit. Although the speed of rotation of the router bit is critical within the range noted, the speed of vertical reciprocation has no set limits. One hundred twenty cycles per minute, or even fewer, have been found to be satisfactory.

If the foregoing procedure is followed, metal such as stainless steel and titanium may be successfully routed with greatly improved, commercially acceptable router bit life. In addition, for a material such as plastic-impregnated glass cloth the dust produced is decreased which makes the operation much more convenient and protects the health of the operator of the machine. The method of routing herein described could equally well be used for materials other than those specifically mentioned with equal success in increasing router bit life and decreasing any dust produced.

The foregoing detailed description is to be clearly understood as by way of illustration and is not to be taken by way of limitation, the spirit and scope of this invention being limited only by the appended claims.

I claim:

1. The method of routing a workpiece comprising the steps of providing an elongated cylindrical member with cutting edges along the surface thereof, rotating said member about its principal axis at a speed in excess of 12,000 revolutions per minute, reciprocating said member along said axis through a stroke at least as great as the thickness of said workpiece, and bringing said workpiece into engagement with said surface of said member for thereby effecting a routing operation.

2. The method of routing a workpiece comprising the steps of providing a member with a fluted cutting surface, gripping said member in a chuck, rotating said member at a rate approximating 18,000 revolutions per minute, axially reciprocating said member through a distance at least as great as the thickness of said workpiece, and bringing said workpiece into engagement with said cutting surface of said member for thereby effecting a routing operation.

3. The method of routing comprising the steps of rotating a fluted cylindrical cutting member at a speed of from 12,000 to 20,000 revolutions per minute, bringing a workpiece into engagement with the surface of said cutter, and oscillating said cutter axially at the time of such engagement through a distance in either direction at least as great as the thickness of said workpiece.

4. The method of routing comprising the steps of rotating a cylindrical cutter having cutting edges on the surface thereof at a speed of from 12,000 to 20,000 revolutions per minute, engaging the surface of the cutter by a workpiece with the principal surface thereof at substantially right angles at the axis of said cutter, and continuously oscillating said cutter at the time of said engagement through a stroke at least as great as the thickness of said workpiece and less than the length of said cutter while continuing said rotation thereof.

References Cited in the file of this patent

UNITED STATES PATENTS

| | | |
|---|---|---|
| 50,781 | Weimer | Oct. 31, 1865 |
| 2,167,647 | Gideon | Aug. 1, 1939 |
| 2,230,292 | Faso | Feb. 4, 1941 |
| 2,333,169 | Glaude | Nov. 2, 1943 |
| 2,466,045 | Schuler | Apr. 5, 1949 |
| 2,468,178 | Crowley | Apr. 26, 1949 |
| 2,675,602 | Kern | Apr. 20, 1954 |

FOREIGN PATENTS

| | | |
|---|---|---|
| 468,923 | Great Britain | July 15, 1943 |